United States Patent
Agnihotri et al.

(10) Patent No.: US 6,763,456 B1
(45) Date of Patent: Jul. 13, 2004

(54) SELF CORRECTING SERVER WITH AUTOMATIC ERROR HANDLING

(75) Inventors: Manoj B. Agnihotri, Lake Oswego, OR (US); Jesus A. Martinez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/514,849

(22) Filed: Feb. 25, 2000

(51) Int. Cl.[7] .............................................. G06F 11/00
(52) U.S. Cl. ............................ 713/2; 709/222; 714/48
(58) Field of Search ........................... 709/222; 713/2; 714/48; 717/171

(56) References Cited

U.S. PATENT DOCUMENTS

| | | | | |
|---|---|---|---|---|
| 5,564,054 A | * | 10/1996 | Bramnick et al. | 713/2 |
| 5,708,776 A | * | 1/1998 | Kikinis | 714/55 |
| 5,884,073 A | * | 3/1999 | Dent | 709/222 |
| 5,974,546 A | * | 10/1999 | Anderson | 713/2 |
| 5,978,912 A | * | 11/1999 | Rakavy et al. | 709/222 |
| 6,230,285 B1 | * | 5/2001 | Sadowsky et al. | 714/14 |
| 6,275,851 B1 | * | 8/2001 | Cromer et al. | 709/217 |
| 6,314,455 B1 | * | 11/2001 | Cromer et al. | 709/217 |
| 6,317,826 B1 | * | 11/2001 | McCall et al. | 713/1 |
| 6,487,464 B1 | * | 11/2002 | Martinez et al. | 700/79 |

* cited by examiner

Primary Examiner—Dennis M. Butler
Assistant Examiner—Albert Wang
(74) Attorney, Agent, or Firm—Paul E. Steiner

(57) ABSTRACT

A reliable and automated boot process for computer systems of limited access. Both the power-on routine and the operating system report error conditions to common storage during execution, are repeatedly re-executed in an effort to automatically boot successfully, and may diagnose system problems as desired. When failures persist, the computer system may be assisted remotely.

27 Claims, 8 Drawing Sheets

SELF CORRECTING SERVER WITH AUTOMATIC ERROR HANDLING

BACKGROUND

This invention relates to server systems and, more particularly, to successful initialization of headless servers.

A headless server is a server system which includes no keyboard, no mouse and no monitor. As expected, headless server systems typically operate without any human intervention. Because of this, headless server systems have higher reliability requirements than most other computer systems. Further, headless server systems ideally operate using minimal or no manual steps.

For a typical computer system, the "boot" process is executed by a program, usually located in read-only memory (ROM) of the computer system. The ROM program may be described as including two separate processes: the power-on self test, or POST, and the basic input/output system, or BIOS. The POST part of the program executes commands such that different circuitry and components of the computer system may be initialized. The BIOS portion includes functions which may be used by software, including POST, for communicating with different devices in the computer system.

Upon receiving power to the computer system, the POST program in the ROM immediately begins execution. The POST performs initialization functions, such as detecting and testing the memory, the display, the non-volatile media, such as hard disk and floppy disk drives, and so on. In some systems, an abbreviated POST, or "quick-boot," may be available.

Once the POST routine completes initialization and testing of the system, control is typically transferred to an operating system, usually located on the hard disk drive. Once the operating system gains control of the system, all run-time operations of the system, including any execution of application programs, are controlled by the operating system. The operating system may or may not utilize the BIOS functions in communicating with the hardware of the computer system.

Currently, boot processes are designed for systems with a monitor, a keyboard and a mouse. These processes assume that the user is present in front of the system, and may thus be available to respond to any POST or operating system errors. These errors may take the form of beeps, screen displays, or other indicia. Typically, execution of either the POST or operating system program will stop once these errors occur. Manual intervention is generally the only way for the boot process to proceed. Contingencies, such as automatic attempts to boot from other devices, are typically not executed by the POST or operating system programs. Further, information is typically not shared between the operating system and the POST routine.

Thus, there is a continuing need for a reliable and automated boot process which may be assisted remotely.

DETAILED DESCRIPTION

In accordance with many embodiments described below, an intelligent boot process may successfully and automatically initialize, or "boot," a system. As described herein, "boot" refers to all operations performed from the moment power is supplied to a system until the operating system is successfully loaded. The system further monitors a running system for operating system malfunction. When POST or runtime failures persist, the computer system may be assisted remotely.

The intelligent boot process may particularly benefit systems such as headless servers. The intelligent boot process successfully executes POST as well as loading the operating system, while handling error conditions along the way. The process anticipates and resolves boot failures, where possible, as well as attempting booting using different devices. The entire process may be achieved without manual intervention.

The intelligent boot process further includes an emergency state of the system. This emergency state results when all boot attempts fail. The POST routine enters a console redirection mode in the emergency state. This permits further actions towards the failed system to be executed using a remote console.

Figure 1A:
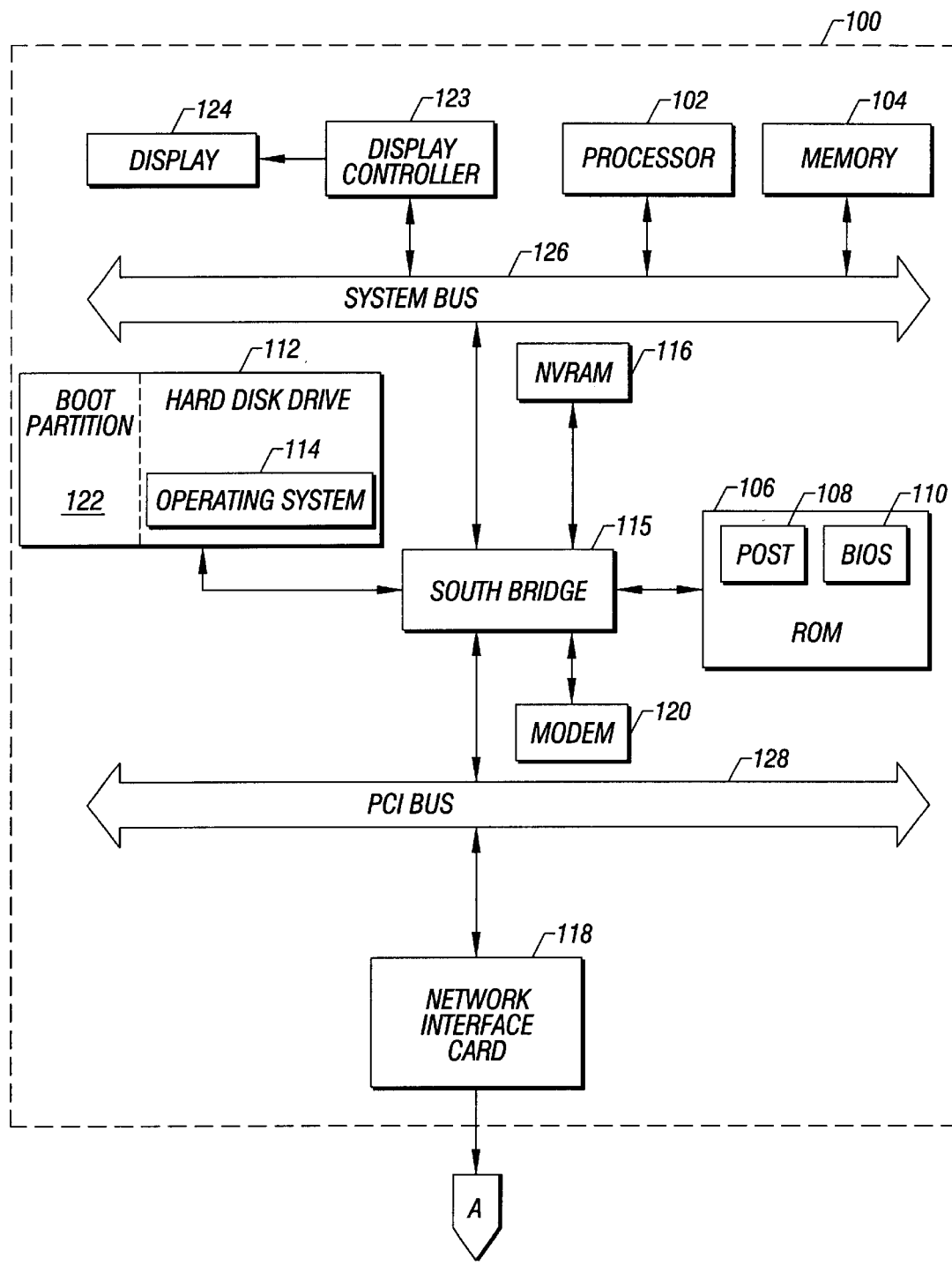
FIGS. 1A and 1B are block diagrams of the system according to one embodiment of the invention.

In FIG. 1A, a computer system 100 includes a processor 102 and a memory 104, connected by a system bus 126. The processor 102 may generally refer to one or more central processing units (CPUs), microcontrollers or microprocessors, such as an X86 microprocessor, a Pentium® microprocessor or an advanced risk controller (ARM), as just a few examples.

Furthermore, the phrase "computer system" may refer to any type of processor-based system that may include a desktop computer, a laptop computer, a headless server, an appliance or a set-top box, as just a few examples. Thus, the invention is not intended to be limited to the illustrated system 100, but rather, the system 100 is an example of one of many embodiments of the invention.

The memory 104 may be one of a number of types of random access memories, such as dynamic random access memories (DRAMs), synchronous DRAMs (SDRAMs), and static RAMs (SRAMs). Other types of memory 104 may include single in-line memory modules (SIMMs) or double in-line memory modules (DIMMs).

The system bus 126 is further coupled to a display controller 123, which supports a display or monitor 124. For a headless server computer system, a monitor may not be present. However, in some embodiments, the headless server may include a small display, such as a small liquid crystal display (LCD), for error reporting.

The computer system 100 further includes a South Bridge 115, between the system bus 126 and a second bus 128. The South Bridge 115 is an input/output (I/O) controller which includes bridge support between the buses 126 and 128, as well as providing an interface to a hard disk drive 112, a modem 120, non-volatile read-only memory (NVRAM) 116, and read-only memory (ROM) 106.

In one embodiment, the bus 128 is a Peripheral Component Interconnect (PCI) bus 128. The PCI bus is compliant with the PCI Local Bus Specification, Revision 2.2 (Jun. 8, 1998, available from the PCI Special Interest Group, Portland, Oreg. 97214). Among other circuitry not shown, the PCI bus 128 may support a network interface card 118, for high-speed connection of the computer system 100 to a network 250, such as a local area network (LAN) or a wide-area network (WAN). Alternatively, connection to the computer network 250 may employ the modem 120.

Also connected to the network 250, a computer system 200, such as a server system, includes a network interface card 218, for high-speed connection, such as to the computer system 100. In one embodiment, the computer system 200 acts as a remote console 200 to the computer system 100. The computer system 200 may perform remote operations which assist in the successful boot of the computer system 100.

The remote console 200 features a processor 202, a memory 204, and a display controller 223, each of which are connected by a system bus 226. In one embodiment, the remote console 200 further supports a display 224, for supplying information about the intelligent boot process of the computer system 100.

Figure 1B:
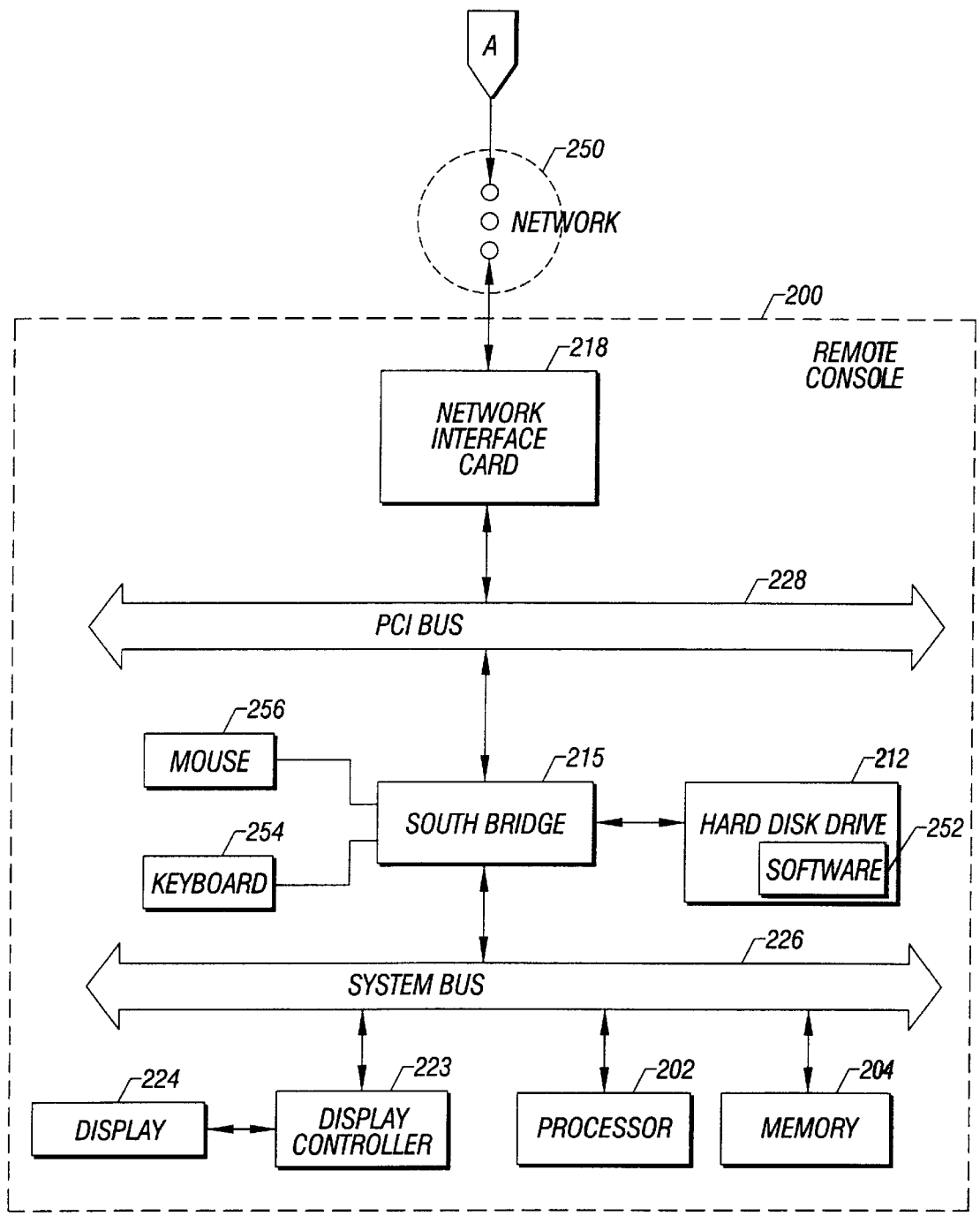

The remote console 200 may further include a hard disk drive 212, such as for storing a software program 252, a keyboard 254, and a mouse 256. In the embodiment of FIG. 1B, these devices are controlled by a South Bridge I/O controller 215, which also connects the system bus 226 to a PCI bus 228. The PCI bus 228 supports the network interface card 218, which connects the remote system 200 to the network 250.

A variety of remote operations of the computer system 200 in support of the computer system 100 may be performed. For example, in one embodiment, a user of the computer system 200 may direct operations of the computer system 100 by using a keyboard 254 or a mouse 256. The software program 252 may present a graphical user interface (GUI) sent to the display 224, for example. The GUI further may provide information pertinent to properly diagnosing and resolving problems of the computer system 100 from the remote computer 200.

In a second embodiment, the software program 252 may operate with no user intervention. Thus, in the following discussion, "remote operation" may encompass either of the embodiments described herein, as well as others for which the computer system 100 receives direction from the computer system 200.

Looking back to the computer system 100, in one embodiment, the ROM 106 includes a power-on self test (POST) 108 program, and a basic input/output system (BIOS) 106 program. Alternatively, the POST 108 and BIOS 110 programs may reside in a flash memory device. The ROM 106 may also include non-volatile memory devices such as erasable and programmable read-only memories (EPROMs), electrically erasable and programmable read-only memories (EEPROMs), and flash memories.

In one embodiment, the hard disk drive 112 includes a boot partition 122. The boot partition 122 is a portion of the hard disk drive 112 which is dedicated to storing code for performing initialization operations. As a safety feature, the contents of the boot partition 122 are not typically affected when accesses to the hard disk drive 112, even including a drive format, occur. The hard disk drive 112 may include one or more boot partitions 122.

The hard disk drive 112 further may store an operating system 114. A portion of the operating system 114 may reside in the boot partition 122, as an additional protection against removal of the operating system 114. The operating system 114 may be loaded into the memory 104, for faster execution.

Because the NVRAM of the computer system 100 is non-volatile, the NVRAM 116 is particularly well-suited for storing information about the system, or "state" information, gathered during execution of the POST routine and the loading of the operating system.

In one embodiment, state information of the computer system 100 is saved in the NVRAM 116 by either the operating system 114 or the POST routine 108. Alternatively, the state information may be saved to a complementary metal oxide semiconductor (CMOS) memory or other non-volatile media.

In addition to saving state information, the intelligent boot process performs additional operations not typical of some systems. For example, in one embodiment, the voltage and the temperature of the computer system 100 are monitored and saved in the NVRAM 116. Further, any sensors which are placed around circuitry of the system 100, such as on the fan and chassis, may be checked for critical conditions.

For certain critical conditions, the boot process may be stopped and the system may be shut down. For other conditions, alternatives to the standard boot process may be initiated. In either case, a complete boot operation may be assured automatically.

Figure 2:
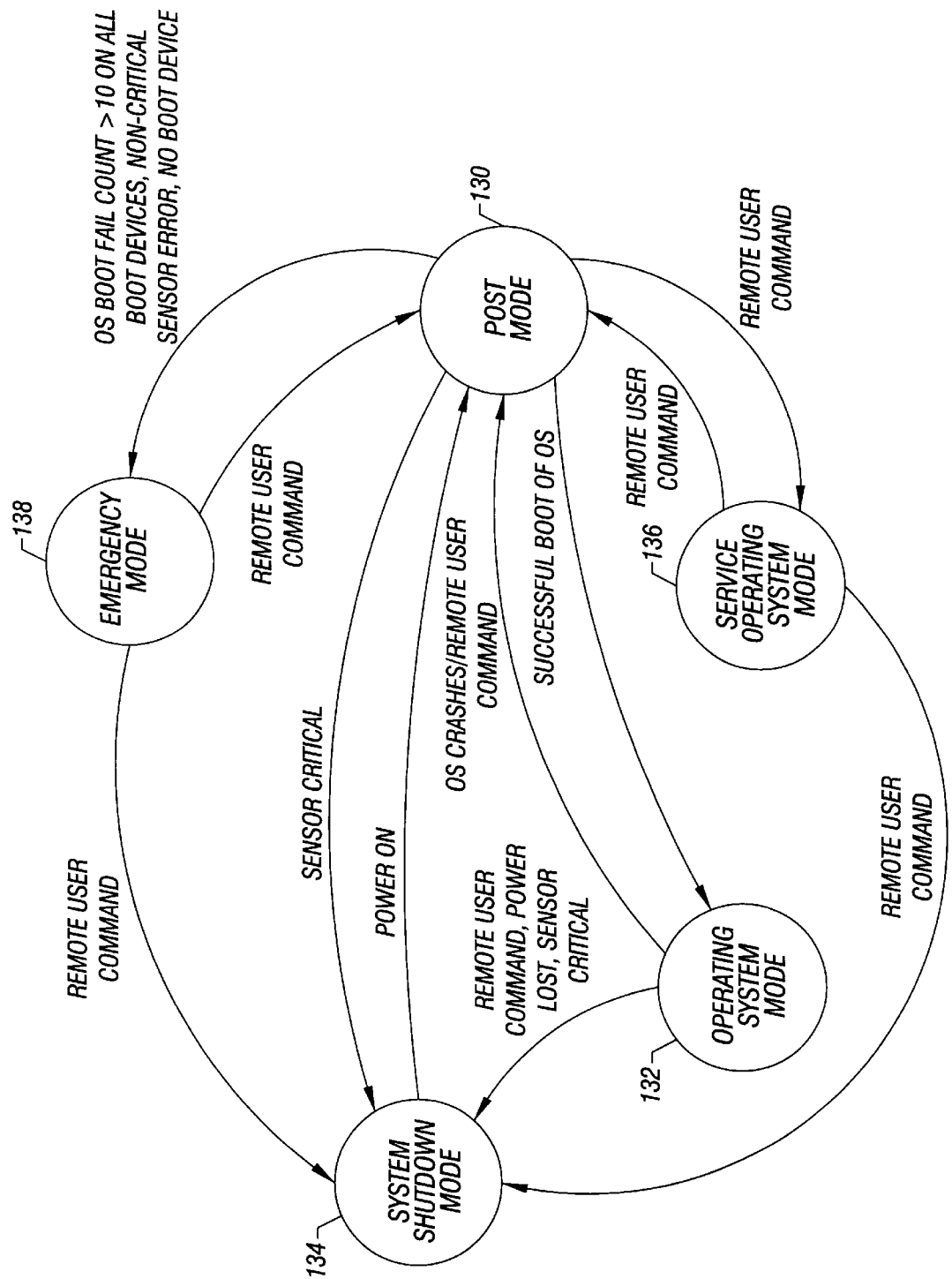
FIG. 2 is a state machine diagram of the system according to one embodiment of the invention.

In FIG. 2, a state diagram indicates five possible modes of the computer system 100, according to one embodiment of the invention. First, a POST mode 130 indicates the time during which the POST program is being executed in the computer system 100, typically in response to power-on of the system 100. However, as shown in FIG. 2, the POST mode 130 may follow any of the four other states.

Next, an operating system mode 132 typically succeeds the POST mode 130, as a result of successfully loading the operating system. In one embodiment of the invention, the operating system mode 132 may be arrived at only subsequent to the POST mode 130, and only as a result of the operating system 114 having been successfully loaded.

A system shutdown mode 134 represents a third possible condition of the intelligent boot process. In one embodiment, the system shutdown mode 134 may be arrived at from all other modes. In a properly running system 100, however, the system shutdown mode 134 may result from a remote shutdown of the operating system 114 in the operating system mode 132. However, power loss, critical sensor conditions, and other conditions, some of which are described in more detail, below, may also cause the computer system 100 to enter the system shutdown mode 134.

A service operating system mode 136 is another option for the intelligent boot process. In one embodiment, the service operating system mode 136 results only from remote operation during the POST mode 130. Likewise, a command from the remote computer 200 may return the computer system 100 to the POST mode 130 from the service operating system mode 136. Alternatively, while in the service operating system mode 136, the remote operation may select the system shutdown mode 134.

In some embodiments, the service operating system is a backup operating system available to the computer system 100 when the operating system 114 fails to properly load. The service operating system may be a "miniature operating system," to which just a portion of the functions available in the operating system 114 are provided.

In one embodiment, a distinct partition of the hard disk drive 112 is allocated for storing the service operating system. In another embodiment, the service operating system is not available on the computer system 100, but instead resides on a remote computer system connected to the computer system 100. Upon receiving a request to run the service operating system, such as from the POST program 108, the service operating system is loaded into the memory 104 from a remote site. Subsequently, the POST routine gives control to the service operating system in the same manner as for the operating system 114.

In some embodiments, the service operating system may perform diagnostic tests upon the computer system 100. In other embodiments, the service operating system mode 136 is used to upload a new version of the BIOS 106 or the POST 108 programs. The test results may be reported to a remote display, may be stored in the NVRAM 116 of the computer system, or may be saved or reported in some other manner, as needed.

Finally, an emergency mode 138 may occur during the intelligent boot process. In one embodiment, the emergency mode 138 may result from any of a number of possible occurrences during the POST mode 130. For example, if the operating system fails to load on all devices, the computer system 100 may proceed from the POST mode 130 to the emergency mode 138. Also, should no boot device be found on the computer system 100, the emergency mode 138 may likewise be invoked from the POST mode 130.

For example, emergency mode 138 may provide a safe haven for addressing non-critical sensor errors on the computer system 100. In one embodiment, upon receiving the sensor error, the POST program 108 or the operating system program 114 may report the error to the remote system 200, and proceed to the emergency mode 138. Other occurrences which cause the computer system 100 to enter the emergency mode 138 include absence of a boot device and failure to load the operating system 114 after multiple attempts.

In one embodiment, the computer system 100 remains in the emergency mode 138 until otherwise directed by the remote console 200. A user of the remote console 200 may retrieve the NVRAM 116 and, based on the information supplied about the computer system 100, take some remedial action. In a second embodiment, retrieval and analysis of the computer system 100 results from operation of the software program 252 without user intervention. In either implementation, a remote operation may power down the computer system 100 (system shutdown mode 134) or execute the POST program 108 (POST mode 130).

In one embodiment, both the operating system 114 and the POST program 108 saves state information to a commonly shared non-volatile area such as the NVRAM 116 of FIG. 1A. There, the operating system 114 and the POST program 108 may, as needed, retrieve information relevant to the success of the boot process. Further, the software program 252 of the remote console 200 may retrieve the contents of the NVRAM 116, in order to analyze the condition of the computer system 100. The NVRAM 116 thus supplies an "event log" for the computer system 100. The event log may store the number of attempted boots of the computer system 100, the number of boot partitions, the currently used boot partition, the location of the service operating system, and so on.

The NVRAM 116 may further store sensor information so that the POST 108 and the operating system 114 routines may observe and/or report critical conditions. For example, sensors may be provided in the computer system 100 for monitoring one or more voltages throughout the system 100, the temperature or temperatures at one or more locations, whether the fan is on and at what speed, and whether the chassis is opened or not. Other conditions of the computer system 100 may be monitored as needed. For certain critical conditions, the boot process may be stopped and the system 100 may be shutdown.

According to several embodiments, the modes described in FIG. 2 are individually illustrated in FIGS. 3–7. Although the flow diagrams depict a particular ordering of events, these modes and the events described therein may be implemented in a number of different ways, depending upon the requirements of the computer system 100, the features of the remote console 200, the desires of the system designer, and so forth.

Figure 3:
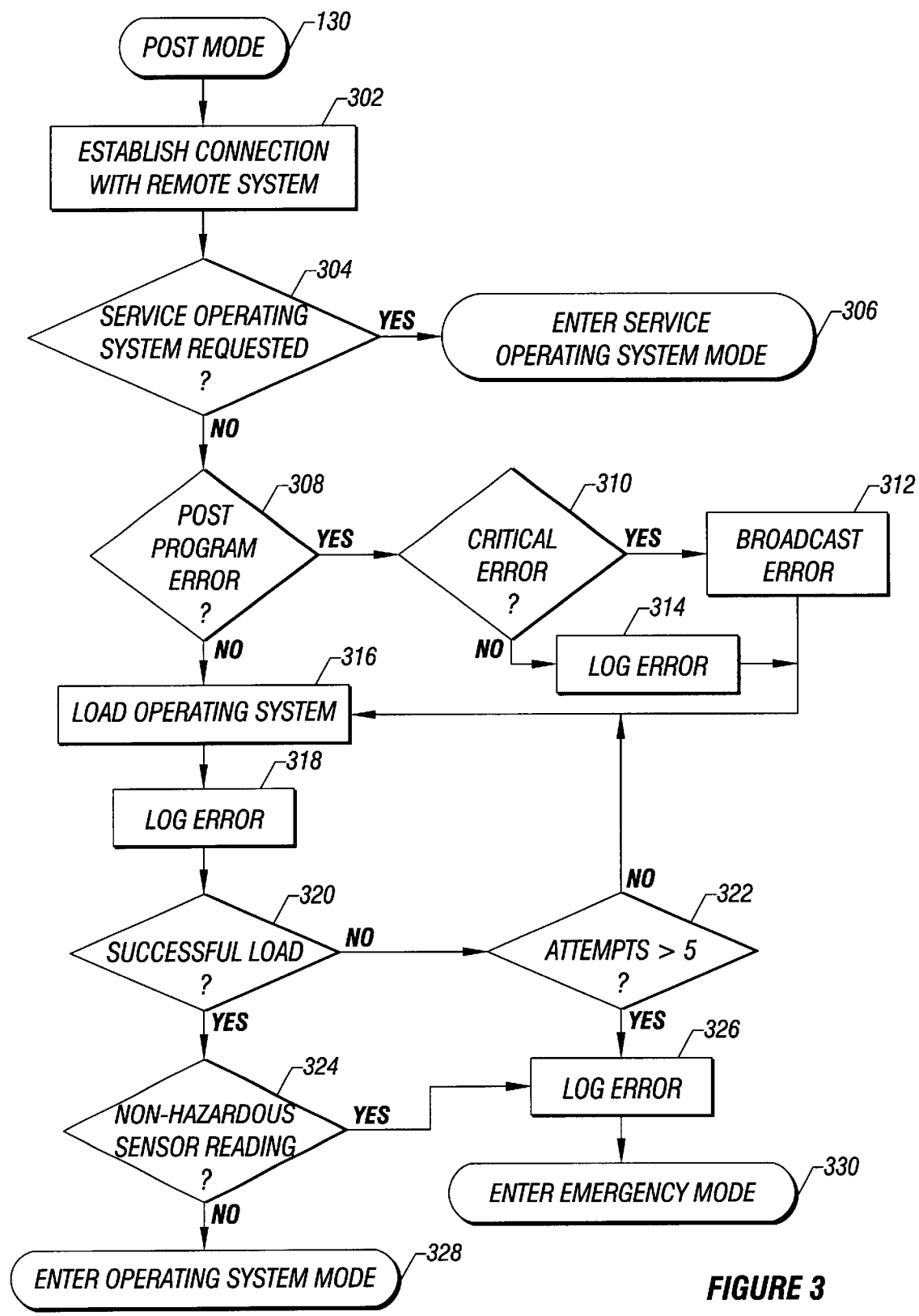
FIG. 3 is a flow diagram of the POST mode of the system according to one embodiment of the invention.

In FIG. 3, a flow diagram depicts the POST mode 130 according to one embodiment. Typically, the computer system 100 receives power and immediately begins executing the POST program 108, stored in the ROM 106 (FIG. 1A). The POST program 108 establishes a connection with the remote console 200 via the network 250 (block 302). The remote connection may occur through a serial port using the modem 120, through a cable using the network interface card 118, or by other means.

Once a connection with a remote console 200 is established, the computer system 100 may receive remote requests. One such remote operation may direct the computer system 100 to enter the service operating system mode 136 (diamond 304), in response to having previously received an error from the computer system 100, for example. If so, the POST program 108 enters the service operating system mode (oval 306), such as by executing a particular program.

In one embodiment, the service operating system mode 136 provides the capability to establish a preboot execution environment, or PXE, with the remote computer system 200. A PXE is an environment in compliance with the Preboot Execution Environment (PXE) Specification, Version 2.1 (Sep. 20, 1999, available from Intel Corporation, 95052).

Briefly, a PXE may be established where a computer system connected to a network fails to boot because of a hardware or a software problem. The computer system may have an executable image downloaded from the network, such as from a server system. The executable image may provide an operating system for the computer system, may enable the computer system to notify the network of problems, and may supply diagnostic tools, and may otherwise assisting the computer system. The service operating system mode 136 is described in more detail in FIG. 6, below.

In FIG. 3, if no request for the service operating system mode 136 was made, the POST program 108 may check for errors during initialization of the computer system 100 (diamond 308). If found, a further check is made to determine whether the error is critical (diamond 310). If a critical error is found, such error may be broadcast, either to the network 250 or to the remote console 200 (block 312).

By reporting the error to one or more remote systems, certain critical errors may be addressed more readily. Correction of errors such as disk failures, memory failures, as well as sensor errors such as extreme voltage conditions, may be facilitated by such error reporting, particularly where a network of computers depends on the integrity of the information provided by the computer system 100. What may be deemed as critical may be left up to the system designer.

Where a POST error is deemed non-critical, however, the error is nevertheless "logged", or stored locally, such as to the NVRAM 116 of the computer system 100 (block 314). Whether the error is broadcast (block 312) or locally stored (block 314), the operating system 114 may next be loaded (block 316).

During the loading of the operating system 114, system information such as events may be logged in the NVRAM 116 (block 318). For example, in one embodiment, several loads of the operating system 114 are attempted before taking remedial action. Accordingly, the number of times the operating system 114 has been loaded is an "event" which may be recorded in the NVRAM 116.

Next, a determination is made whether the operating system 114 successfully loaded (diamond 320). If not, the operating system 114 may be reloaded (block 316) if the load has not been attempted a predetermined number of times (diamond 322). In one embodiment, the operating system 114 is reloaded up to five times. If, however, five load attempts have been made and failed, an error is logged in the NVRAM 116 and the POST mode 130 enters the emergency mode 138 (oval 330). The emergency mode 138 is discussed further with respect to FIG. 5, below.

In another embodiment, after the operating system 114 has repeatedly been loaded without success, the computer system 100 may load a second operating system, such as one stored on a second disk partition. The additional operating system may be a simplified version of the operating system 114, perhaps permitting only rudimentary operations, so that only a small disk partition is needed. Such an implementation may provide an additional safeguard against an otherwise inoperative system.

If the operating system 114 has successfully loaded (diamond 320), in one embodiment, the sensors are checked for critical errors (diamond 324). If non-hazardous but critical sensor errors occur in the computer system 100, the error event is logged (block 326) and the POST mode 130 enters the emergency mode 138 (oval 330). If, instead, no critical sensor errors are found, the POST mode 130 enters the operating system mode 132 (oval 328).

Figure 4:
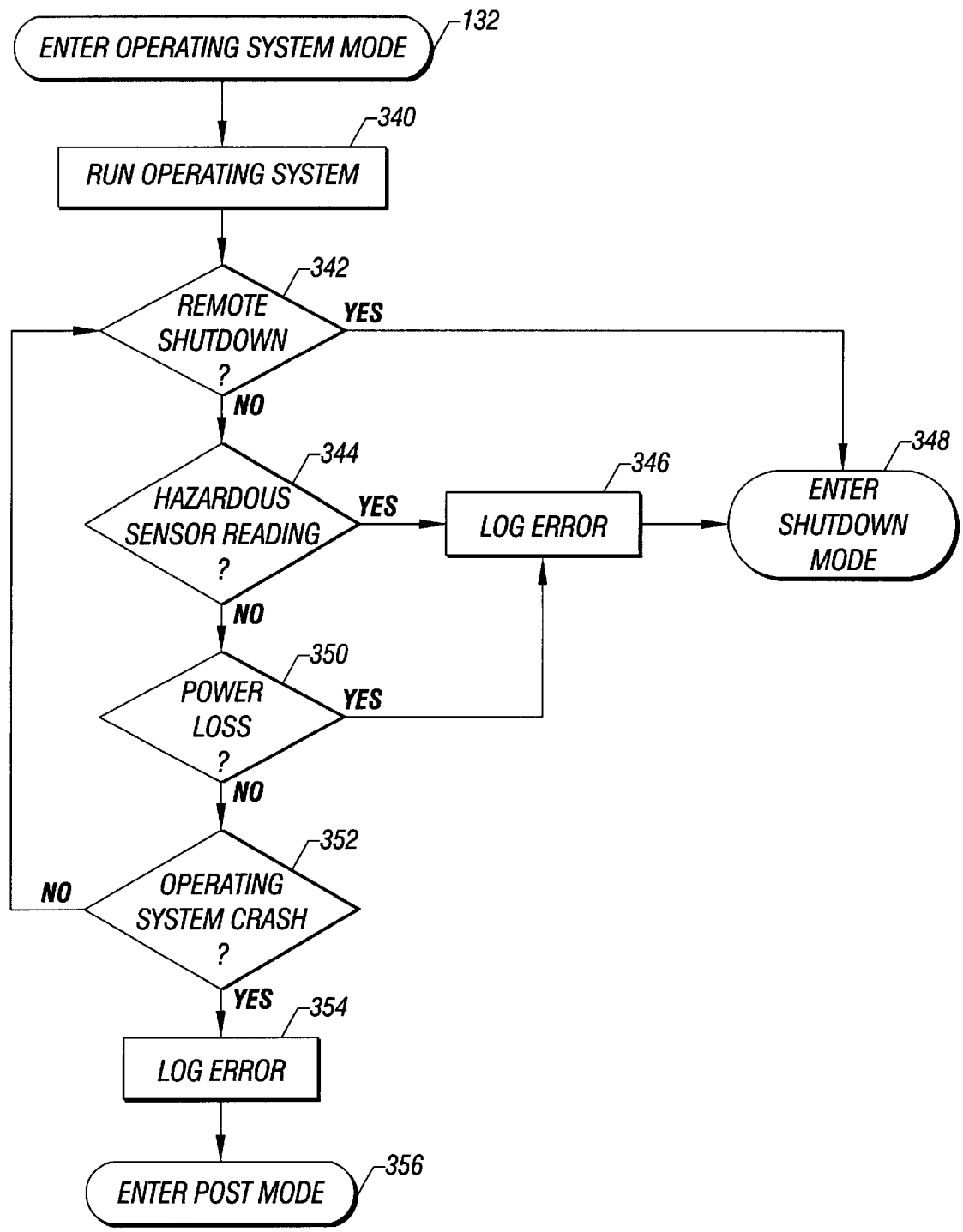
FIG. 4 is a flow diagram of the operating system mode of the system according to one embodiment of the invention.

In FIG. 4, a flow diagram depicts the operating system mode 132 according to one embodiment. At this point, the operating system 114 has been successfully loaded in the POST mode 130 (FIG. 3). While the operating system 114 is running (block 340), the computer system 100 may be monitored for conditions, such as errors. These conditions may be detected and resolved in any order, as the illustration of FIG. 4 represents but a single embodiment.

If, for example, a remote direction to shut down the computer system 100 is received by the computer system 200 (diamond 342), the computer system 100 may enter the system shutdown mode 134 (oval 348). If a sensor reading is determined to be hazardous (diamond 344), as another example, the error is logged in the NVRAM 116 (block 346). From there, the system also enters the shutdown mode 134. If the computer system 100 suffers a power loss (diamond 350), then, to the extent possible, the error is saved in the NVRAM (block 346), and the shutdown mode 134 is entered.

If, the operating system 114 crashes (diamond 352), the error is saved in the NVRAM 116 (block 354), as with the sensor and power loss errors. However, for an operating system 114 failure, the computer system 100 returns to the POST mode 130 (oval 356), according to one embodiment. There, attempts to reload the operating system 114 may be made. Alternatively, in some embodiments the service operating system mode 136 may be initiated remotely, for further diagnosis of the computer system 100 from the operating system mode 132.

Figure 5:
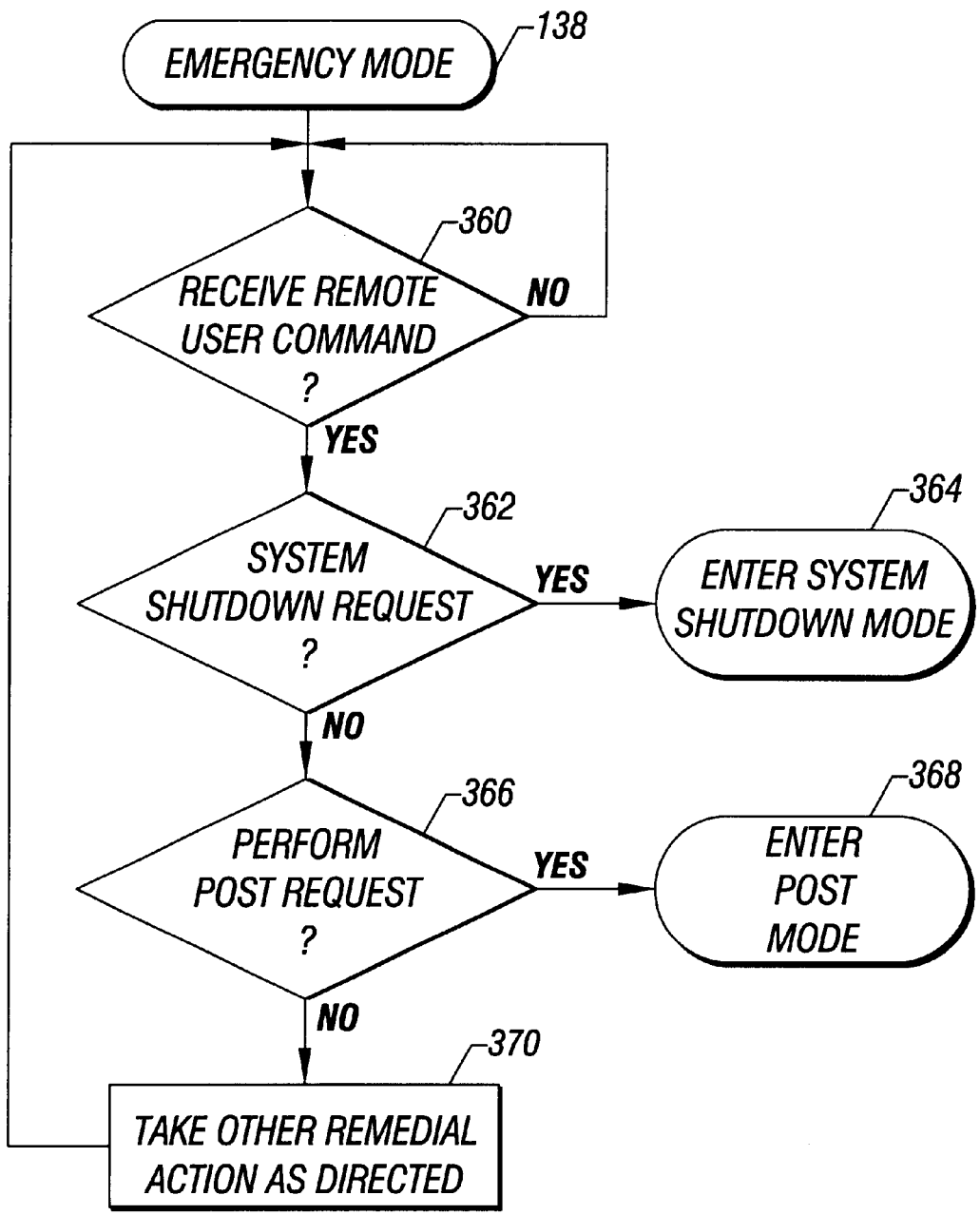
FIG. 5 is a flow diagram of the emergency mode of the system according to one embodiment of the invention.

In FIG. 5, a flow diagram illustrates the emergency mode 138 of FIG. 2, according to one embodiment. In emergency mode 138, the computer system 100 essentially performs no operations until directed to do so from the remote console 200. So, until the computer system 100 receives a remote user command (diamond 360), the computer system 100 does nothing.

After the remote command is issued, the computer system 100 may act. For instance, upon receiving a system shutdown request (diamond 362), the computer system 100 may enter the system shutdown mode 134 (oval 364). Or, upon receiving a request to execute the POST program 108 (diamond 366), the computer system 100 may enter the POST mode 130 (oval 368).

Further, while in the emergency mode 138, the computer system 100 may be sent commands to take other remedial action (block 370). For example, the remote system 200 may request the event log from the NVRAM 116. A number of remedial requests may be made from the remote console 200 while in the emergency mode 138.

Figure 8:
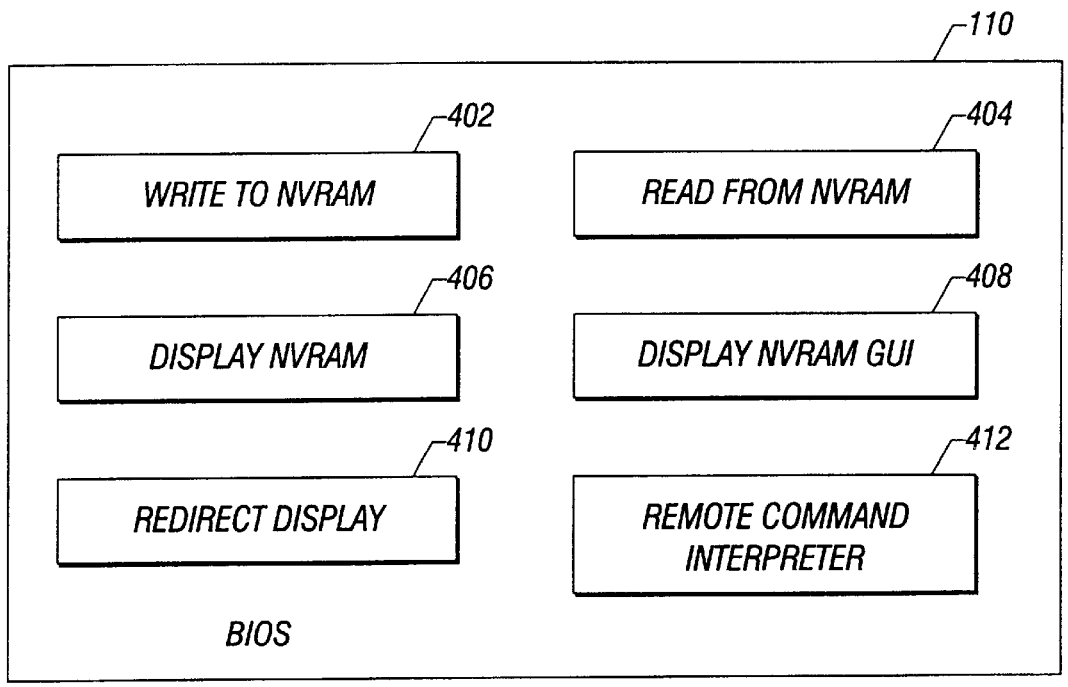
FIG. 8 is a block diagram of BIOS functions according to one embodiment of the invention.

In one embodiment, as shown in FIG. 8, the BIOS 110 of the computer system 100 includes functions for reading from the NVRAM 116 (function 404), and for writing to the NVRAM 116 (function 402). Likewise, the BIOS 110 may include functions for displaying the contents of the NVRAM 116 (function 406), such as for computer systems 100 which are not headless, e.g., systems which include the display monitor 124. Some embodiments provide a function for displaying the NVRAM contents 116 as a graphical user interface (function 408).

Further in one embodiment, one BIOS function, redirect display 410, intercepts the display of the NVRAM 116 originally intended for the display 124, such as provided using the display NVRAM function 406 or the display NVRAM GUI function 408. The redirect display function 410 sends the data to the modem 120 or to the network interface card 118, as appropriate. The redirect display function 410 may thus be executed by the POST program 108 in the emergency mode 138 to supply the contents of the NVRAM 116 to the remote console 200.

Further, for use during the emergency mode 138, the BIOS 110 may include a remote command interpreter function 412. The function 412 receives commands from the remote console 200 from the modem 120 or from the NIC 118. The various BIOS functions described in FIG. 8 may thus be used during the emergency mode 138 to facilitate error handling.

Figure 6:
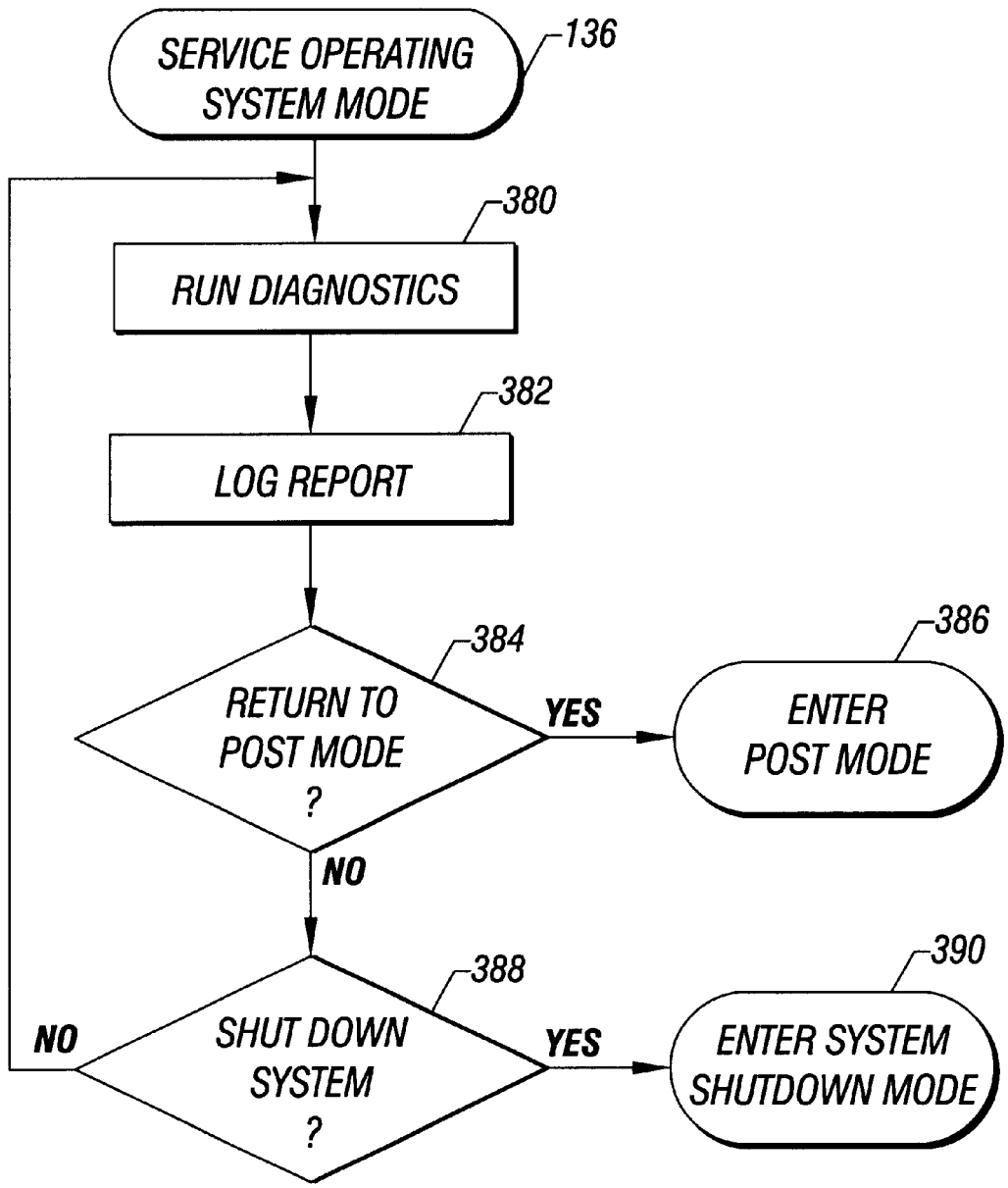
FIG. 6 is a flow diagram of the service operating system mode of the system according to one embodiment of the invention.

In FIG. 6, the service operating system mode 136, according to one embodiment, includes the capability to run a diagnostics program (block 380) and log a diagnostic report (block 382). Additionally, a PXE environment, as described above, may permit downloading of operating system, diagnostic, problem reporting, and other types of software images which enhance the capabilities of the computer system 100.

The computer system 100 may also receive direction from the remote console 200, to transfer the computer system 100 into another operating mode. For example, the computer system 100 may receive a remote command (diamond 384)

to return to the POST mode 130 (oval 386). Or, the remote console 200 may issue a command (diamond 388) to the computer system 200 to shut itself down (oval 390). In other embodiments, the computer system 100 may enter the emergency mode 138 from the service operating system mode 136.

Figure 7:
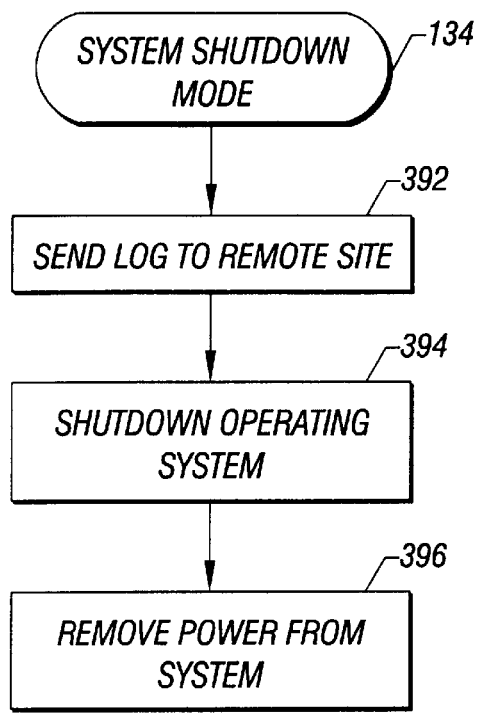
FIG. 7 is a flow diagram of the system shutdown mode of the system according to one embodiment of the invention.

In FIG. 7, the system shutdown mode 134 may perform event logging operations, such as sending the event log from the NVRAM 116 to the remote console 200 (block 392). Further, the operating system 114 may be shut down (block 394). Other software operations may be performed as needed, before removing power from the computer system 100 (block 396).

The intelligent boot process may employ distinct error reporting features, sometimes dependent upon the type of error condition as well as the availability of reporting devices on the computer system 100. For example, in one embodiment, the modem 120 (FIG. 1A) may connect the computer system 100 to the network 250 such that an automatic pager system may be initiated to one or more remote systems. By receiving the page from the computer system 100, a remote user may be apprised of the error condition in the computer system 100. For a system with limited output capability, such as a headless server with no display monitor, a remote paging system may be particularly beneficial.

In a second embodiment, the network interface card 118 is connected to a local area network (LAN), so that error conditions may be broadcast to other parts of the network. In yet a third embodiment, the computer system 100 itself includes a display 124 to which error messages may be made available for viewing. In one embodiment, the display is a 128×64 byte pixel liquid crystal display (LCD). Other implementations for reporting error messages from the computer system 100, including reporting to a display monitor, when present, may be made.

Thus, according to several embodiments, the computer system 100 may utilize an intelligent boot process such that a successful boot may result despite a number of possible hardware or software impediments. Further, the intelligent boot process may automatically anticipate and resolve most of the unfavorable occurrences without intervention by a user, or with assistance of a remote console. In some embodiments, diagnostic operations may be performed, system error logs may be communicated across the network, remote consoles may be paged, clean or updated operating systems may be downloaded, and other operations may be performed.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:
    identifying a first initialization failure on a first processor-based system;
    attempting to re-initialize the first processor-based system without manual intervention;
    identifying a second initialization failure on the first processor-based system;
    sending an indicator to a second processor-based system;
    receiving a command in response to the second initialization failure from the second processor-based system; and
    loading a remote command interpreter function on the first processor-based system.

2. The method of claim 1, further comprising:
    loading a program to send information about the first processor-based system to a display; and
    loading a second program, wherein the second program:
        intercepts the information from being received by the display; and
        sends the information to the second processor-based system.

3. The method of claim 1, further comprising:
    enabling a modem within the first processor-based system;
    dialing a second modem within the second processor-based system by the first modem; and
    connecting the first and the second modem by a telephone line.

4. The method of claim 3, sending an indicator to a second processor-based system further comprising paging the second modem by the first modem.

5. The method of claim 1, further comprising:
    establishing a connection to a network using a network interface card in the first processor-based system;
    establishing a second connection to the network using a second network interface card in the second processor-based system; and
    sending an address associated with the second processor-based system across the network by the first processor-based system.

6. The method of claim 5, sending an indicator to the second processor-based system further comprising addressing a local area network alert to the second processor-based system.

7. A system, comprising:
    a processor; and
    a storage medium coupled to the processor including a software program that, upon execution:
        identifies a first initialization failure on the system;
        attempts to re-initialize the system without manual intervention;
        identifies a second initialization failure on the system;
        sends an indicator to a second processor-based system;
        receives a command in response to the second initialization failure from the second processor-based system;
        stores information about the system in the memory,
        receives a command from the second processor-based system to supply information about the system;
        retrieves the information from the memory; and
        sends the information to the second processor-based system.

8. The system of claim 7, wherein the memory is a non-volatile random access memory.

9. The system of claim 7, wherein the first initialization failure is a failure of an operating system to load properly.

10. The system of claim 7, wherein the system is a headless server system.

11. The system of claim 7, wherein the indicator is a page of the second processor-based system.

12. An article comprising a medium storing software that causes a processor-based system to:
    identify a first initialization failure on the processor-based system;
    attempt to re-initialize the processor-based system without manual intervention;

identify a second initialization failure on the processor-based system;

send an indicator to a second processor-based system;

receive a command from the second processor-based system in response to the second initialization failure of the processor-based system; and load a remote command interpreter function on the processor-based system.

13. The article of claim 12, further storing software that causes a processor-based system to:

load a program to send information about the processor-based system to a display; and load a second program to intercept information from being received by the display and to send the information to the second processor-based system.

14. The article of claim 12, further storing software that causes a processor-based system to respond to the command by entering a power-on mode.

15. The article of claim 12, further storing software that causes a processor-based system to respond to the command by shutting down the system.

16. A method of operating a self correcting system, comprising:

attempting a first boot of a first processor-based system;

identifying an error during the first boot;

making an adjustment in the boot process in accordance with the identified error and without manual intervention;

attempting a second boot of the first processor-based system;

loading a remote command interpreter function on the first processor-based system;

sending an indicator from the first processor-based system to a second processor-based system; and receiving information from the second processor-based system in response to the indicator and without manual intervention, wherein the adjustment in the boot process is based on the information received from the second processor-based system.

17. The method of claim 16, wherein the making an adjustment comprises re-loading a primary operating system.

18. The method of claim 16, wherein the making an adjustment comprises identifying a different boot device.

19. The method of claim 16, wherein the making an adjustment comprises identifying a backup operating system for booting.

20. The method of claim 19, wherein the backup operating system resides on a hard disk of the first processor-based system.

21. The method of claim 20, wherein the backup operating system resides on a boot partition of the hard disk.

22. The method of claim 20, wherein the backup operating system and a primary operating system reside on different portions of the hard disk.

23. The method of claim 22, wherein the backup operating system and a primary operating system reside on different boot partitions of the hard disk.

24. The method of claim 19, wherein the backup operating system comprises a pre-boot execution environment.

25. The method of claim 19, wherein the backup operating system resides on a second processor-based system.

26. The method of claim 16, further comprising:

sending a page from the first processor-based system subsequent to the second boot attempt.

27. The method of claim 16, wherein at least two adjustments of the boot process are made on the first processor-based system with corresponding re-boot attempts before sending the indicator to the second processor-based system.

* * * * *